United States Patent [19]

Asakura et al.

[11] Patent Number: 4,645,702
[45] Date of Patent: Feb. 24, 1987

[54] MAGNETIC RECORDING MEDIUM

[75] Inventors: Toshiyuki Asakura; Hiroaki Kobayashi; Nobuaki Itoh, all of Otsu, Japan

[73] Assignee: Toray Industries, Inc., Tokyo, Japan

[21] Appl. No.: 685,965

[22] Filed: Dec. 27, 1984

Related U.S. Application Data

[63] Continuation of Ser. No. 469,278, Feb. 24, 1983, abandoned.

[30] Foreign Application Priority Data

Mar. 30, 1982 [JP] Japan ................................ 57-51895
Sep. 8, 1982 [JP] Japan .............................. 57-155158

[51] Int. Cl.⁴ .............................................. G11B 5/70
[52] U.S. Cl. ..................................... 428/141; 427/128; 427/132; 428/336; 428/458; 428/474.4; 428/694; 428/900
[58] Field of Search ............ 428/694, 695, 900, 474.4, 428/475.5, 141, 458, 336; 427/128, 132; 360/134–136

[56] References Cited

U.S. PATENT DOCUMENTS 3,966,686 6/1976 Asakura ............................... 528/490
4,112,187 9/1978 Asakura ............................... 428/900
4,308,311 12/1981 Ogawa ................................. 428/694

Primary Examiner—Ellis P. Robinson
Attorney, Agent, or Firm—Austin R. Miller

[57] ABSTRACT

Disclosed is a magnetic recording medium which comprises a film of an aromatic polyamide having at least 50 mole % of recurring units represented by the following general formula:

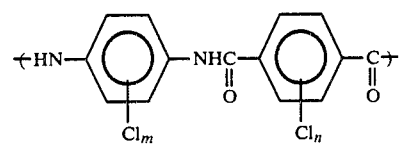

wherein m and n are integers of from 0 to 4, with the proviso that the case where both of m and n are 0 is excluded, and at least one high performance magnetic layer of a metal or metal compound vacuum-deposited on the aromatic polyamide film. This magnetic recording medium shows a reduced dimensional change and is substantially free of curling or breakage due to elongation, and is excellent in flatness and adhesive strength between the base film and the magnetic layer. Accordingly, this magnetic recording medium is suitable for high-density magnetic recording.

8 Claims, No Drawings

MAGNETIC RECORDING MEDIUM

This application is a continuation of application Ser. No. 469,278 filed 2/24/83 now abandoned.

BACKGROUND OF THE INVENTION (1) Field of the Invention

The present invention relates to a magnetic recording medium comprising an aromatic polyamide film and a magnetic layer vacuum-deposited on the aromatic polyamide film, which is excellent in adhesive strength and flatness of the magnetic layer and also in the balance of environmental stability in dimension.

(2) Description of the Prior Art

Aromatic polyamide films have heretofore been used at high temperatures by virtue of their high heat resistance, and uses of laminates of aromatic polyamide films with other materials under high temperature conditions have been examined. When an aromatic polyamide is used alone in the form of a single-layer film, it is preferred from the viewpoint of flatness or stabilization of shape that the thermal dimensional change be as small as possible. However, when an aromatic polyamide is used in the form of a laminate with a metal or other material of different thermal dimensional change characteristic, wrinkles or curls take place during use of the laminate at a high temperature or after preparation of the laminate at a high temperature. As the result, the flatness is reduced. Although "thermal dimensional change" includes thermal shrinkage and thermal expansion, conventional single-layer films, however, have been prepared while taking only one aspect of the thermal dimensional change into consideration.

Recently, a demand has arisen for increased recording density in magnetic recording media and means for attaining such an increase have become a focus of attention in the art. The conventional magnetic recording medium of the so-called coating type was formed by coating a homogeneous dispersion of a magnetizable powder of a metal oxide such as $\gamma\text{-}Fe_2O_3$ or a cobalt or nickel alloy in a binder of an appropriate organic polymer on a plastic base film. Recently, a magnetic recording medium has been developed which is prepared by forming a high performance thin magnetic metal layer of cobalt or the like, free of a polymer binder, directly on a base by vacuum deposition or sputtering. By the term "vacuum deposition" is meant a process in which a metal or a metal compound or a mixture thereof is sublimated under a lower pressure than normal pressure and deposited on a base film.

Serious problems, however, have been encountered in the practical utilization of a magnetic recording medium having such a high performance thin magnetic metal layer. For example, there is poor adhesive strength between the base and the high performance thin magnetic metal layer and also inferior flatness due to the base film deformation and the difference of the thermal expansion coefficient between the base and the high performance thin magnetic metal layer. The high performance thin magnetic metal layer ordinarily has a thickness of 200 to 7,000 Å, for example, about 1,000 Å. Since the thickness of the magnetic layer is extremely thin, an especially high surface smoothness is required for the base which has a crucial effect on the magnetic layer surface, while such a high surface smoothness is not required in the magnetic recording medium of the conventional coating type at all, where the magnetic layer is usually thicker than 2 $\mu$m. This makes impossible the use of the method of roughening the surface of the base to improve the adhesive strength. Furthermore, since the high performance thin magnetic metal layer is composed solely of a metal or metal compound, it is poor in elongation, in other words, easily breaks at small elongation and, since no buffer effect as attained in the magnetic recording medium of the coating type can be expected, the resistance to external force is very low. Moreover, the fact that the base is ordinarily composed of an organic polymer poses the problem of bonding organic and inorganic materials, a problem which may be overlooked in the magnetic recording medium of the coating type where the compatibility of the coating layer with the base is enhanced by the use of the organic binder.

Various methods have been proposed to improve the adhesive strength of the high performance thin magnetic metal layer. For example, in case of vacuum deposition, there has been proposed a method in which electron beam vacuum deposition conditions are changed so as to obtain optimum results and a method in which a polyethylene terephthalate film, which is most popularly used as the base, is subjected to a surface treatment such as a glow discharge treatment or buff treatment. However, no substantial improvement of adhesive strength can be attained by these methods. First, regardless of the results of adhesive cellophane tape tests, these methods do not result in adhesive strength satisfactory for practical use. In practical use, "adhesive strength" has a broader meaning, i.e., the high performance thin magnetic metal layer may not peel or be damaged when the magnetic recording medium, especially magnetic tape, is brought into contact with a head or a roll of the tape running system. In the case of a video tape, the magnetic recording medium is exposed to very high relative speed contact with a head, repeated contact in the same portion at the still position, contact with a post, and other severe conditions. In practice, therefore, the adhesive strength must be so high that there is no substantial drop-out even after the magnetic recording medium is subjected to more than 100 times of running. Second, the stiffness and toughness of the high performance thin magnetic metal layer are important for attaining an adhesive strength satisfactory in the above-mentioned practical sense, and even if the surface treatment of the base is sufficiently performed, the characteristics of the deposited material will be improved only to a minor extent. Third, as pointed out hereinbefore, the physical surface treatment has a fatal adverse effect on the surface smoothness of the base of the magnetic recording medium comprising the high performance thin magnetic metal layer formed on said base.

In order to obtain an excellent vacuum deposited magnetic recording medium, the following endurance requirements and the above-mentioned adhesive strength requirements should be met.

(1) High mechanical strength characteristics. Not only the strength and elongation, but also the tensile modulus should be high. In other words, the dimensional stability against external force should be high.

(2) Excellent dimensional stability at high temperatures.

(3) High dimensional stability against ambient changes such as moisture and temperature.

In the preparation of a magnetic recording medium by vacuum deposition, the temperature of the base film is readily elevated, and thus, vacuum deposition is carried out at an elevated temperature. Elevation of the temperature of the base film is advantageous for improving the magnetic characteristics and adhesive strength, but necessitates a high heat resistance for the base film. Further, in order to prevent degradation of the flatness of the base film owing to the different thermal dimensional characteristics of the material to be deposited, it is important that the base film show a specific thermal dimensional change at the elevated temperature at the time of vacuum deposition. An aromatic polyamide film exhibiting a reduced dimensional change and a magnetic recording medium comprising this film are proposed in U.S. Pat. Nos. 3,966,686 and No. 4,112,187. According to these known techniques, reduction in the dimensional change of the base film is intended. However, the magnetic recording medium prepared by vacuum deposition using this base film has some problems in the flatness and other properties.

SUMMARY OF THE INVENTION

It is primary object of the present invention to provide a magnetic recording medium comprising a magnetic layer formed on an aromatic polyamide film by vacuum deposition, which medium is excellent in flatness and adhesion and which does not form curls or wrinkles. According to the present invention, there is provided a magnetic recording medium using as the base film an aromatic polyamide film having specific thermal dimensional change characteristics wherein the product of the thermal shrinkage factor, and said film thermal expansion coefficient is in the range of from $1.0 \times 10^{-7}$ to $1.0 \times 10^{-4}$ [(mm/mm/°C.)$\times$(%)] and having a density of 1.400 to 1.490 g/cm$^3$.

Another object of the present invention is to provide a magnetic recording medium having a very thin magnetic layer formed by vacuum deposition.

A further object of the present invention is to provide a magnetic recording medium in which the magnetic recording characteristics are highly improved by using a base film on which vacuum deposition can be carried out at a high temperature.

More specifically, in accordance with the present invention, there is provided a magnetic recording medium which comprises a film of an aromatic polyamide having at least 50 mole % of recurring units represented by the following general formula:

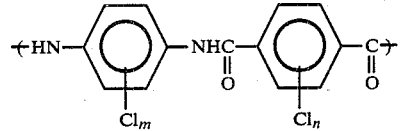

wherein m and n are integers of from 0 to 4, with the proviso that the case where both m and n are 0 is excluded, and at least one high performance magnetic layer of a metal or metal compound vacuum-deposited on the aromatic polyamide film.

DESCRIPTION OF THE PREFERRED EMBODIMENTS

The aromatic polyamide used in the present invention has a main structure comprising 50 to 100 mole %, preferably 60 to 100 mole %, of recurring units represented by the following general formula:

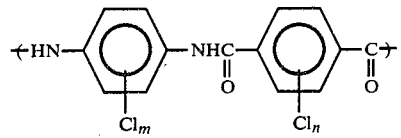

wherein m and n are integers of from 0 to 4, with the proviso that the case where both of m and n are 0 is excluded. A content of the above recurring units lower than 50 mole % results in a film with a low stiffness and an undesirably increased thermal expansion coefficient or thermal shrinkage factor. The main structure of this aromatic polyamide consists of p-linkage amides and at least one benzene ring of each recurring unit has a chlorine substituent. Inclusion of chlorine substituents in the recurring units enables improvement of the solubility of the polymer in an organic solvent and reduction of the moisture absorption or the coefficient of expansion by absorption of moisture when the polymer is in the form of a film to a level much lower than in case of a non-substituted polymer.

The main structure of the polyamide may be prepared from a diamine and a dicarboxylic acid or its derivative corresponding to the recurring units according to known methods. For example, the main structure is prepared from a combination of an acid halide and a diamine or of a diisocyanate and a dicarboxylic acid. More specifically, there can be mentioned combinations of terephthaloyl chloride, 2-chloroterephthaloyl chloride and 2,6-dichloroterephthaloyl chloride with 2-chloro-p-phenylene diamine, p-phenylene diamine, 2,5-dichloro-p-phenylene diamine and 2-methyl-5-chloro-p-phenylene diamine, and combinations of 2-chloro-p-phenylene diisocyanate, p-phenylene diisocyanate and 2,5-dichloro-p-phenylene diisocyanate with terephthalic acid, 2-chloroterephthalic acid and 2,6-dichloroterephthalic acid.

The polymerization method may be any of low temperature solution polymerization, interfacial polymerization, melt polymerization or solid state polymerization. However, there is preferably adopted a process in which an acid chloride is reacted with a diamine in an amide or urea type organic solvent according to the low temperature solution polymerization method. In this case, a poor solvent to the formed polymer is added to the reaction mixture to effect precipitation and the precipitated polymer is recovered and dissolved in an organic solvent again to form a film-making dope. Alternatively, hydrogen chloride formed during the polymerization is neutralized with an alkali metal or alkaline earth metal base, an epoxy compound or an organic amine and then, the obtained dope is used for making a film. As the organic solvent, there can be mentioned, for example, amide type solvents such as N-methylpyrrolidone, dimethylacetamide, dimethylformamide, dimethylimidazolidinone and N-ethylpyrrolidone.

The polymer of the present invention contains at least 50 mole % of the above-mentioned recurring units. The remaining structural units are not particularly critical but units forming an amide linkage are preferred. As preferred examples of the units forming an amide linkage, there can be mentioned an m-linkage unit represented by the following formula:

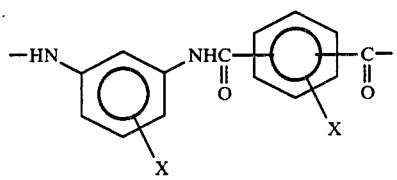

wherein X stands for a hydrogen atom, a halogen atom, a nitro group, an alkyl group having 1 to 20 carbon atoms or a phenyl group; a unit containing a linkage represented by the following formula:

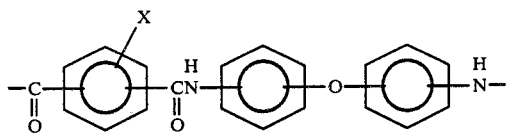

wherein X is as defined above; a sulfone linkage-containing unit represented by the following formula:

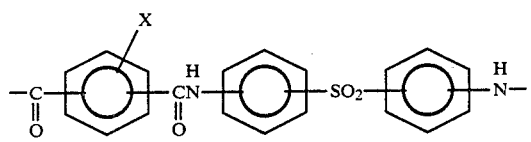

wherein X is as defined above; a unit containing a methylene chain having 2 to 20 carbon atoms in the main chain; and a p-oriented linkage unit represented by the following formula:

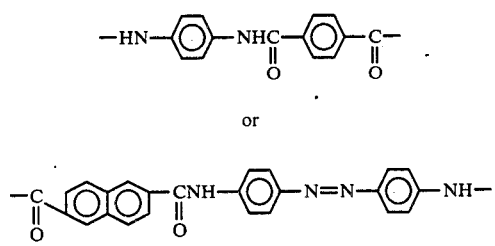

The foregoing linkage units may comprise therein another linkage unit such as a urea linkage

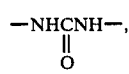

an imide linkage

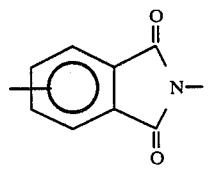

or an ester linkage -COO-.

In order to exert the film characteristics sufficiently, the following units are preferred as the copolymer units:

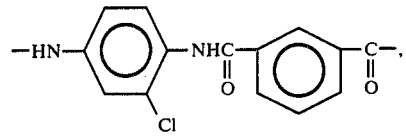

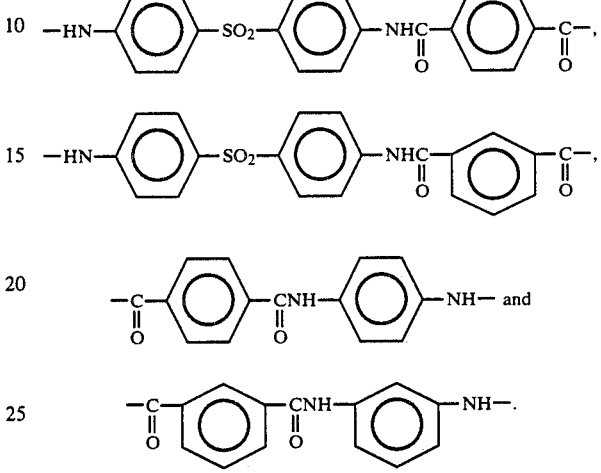

In order to improve the producitvity at the film-making step, improve the stretchability and obtain a thick film, it is often preferred that copolymer units be introduced into the polymer at the sacrifice of some extent of the mechanical properties of the polymer. The composition of the copolymer may be of the random type or the copolymer may be of the block or graft type. A mixture of two or more of polymers may also be used.

It is preferred to use an amide type solvent such as N-methylpyrrolidone, dimethylacetamide, dimethylformamide, methylimidazolidinone or N-ethylpyrrolidone as the solvent for formation of a film-making dope. A dope containing 1 to 50% by weight of the polymer in such a solvent as mentioned above is preferably used. In order to improve the solubility of the polymer or the stability of the film-making operation, it is preferred that an alkali metal or alkaline earth metal halide formed by neutralization be contained in the dope or such a halide prepared separately be added to the dope. As the halide having this effect, there are preferably used lithium chloride, lithium bromide, calcium chloride and calcium bromide. Furthermore, ammonia, an organic amine such as ethanol amine or pyridine, and various stabilizers may be incorporated so as to complete neutralization.

The viscosity of the film-making dope is preferably 100 to 20,000 poises at a temperature at which casting is carried out by using a die or the like. The inherent viscosity $\eta_{inh}$ of the polymer (as determined at 30° C. on a solution of 0.5 g of the polymer in 100 ml of sulfuric acid) is preferably in the range of from 0.5 to 6.5, more preferably from 1 to 5.

In the case where an inorganic salt such as mentioned above is contained in the dope to be used for formation of the film of the present invention, it is necessary to later extract the inorganic salt according to the wet process. In this case, it is preferred that after the dope is cast on a glass or metal plate, a drum, a belt, a film, a foil or other supports to impart a smooth surface, the cast film be transferred to the wet process after removing a part of the solvent by drying, if necessary. When drying is carried out on the support, in order to prevent bubbling by rapid evaporation of the solvent or prevent formation of a skin layer full of irregularities on the surface portion of the cast film, it is preferred that the rate of removal of the solvent be controlled to the range of from $1 \times 10^{-5}$ to 0.1 g/min.cm$^2$. At the casting step, the dope may be extruded into a single layer or multiple layers.

The cast dope in the state supported on the support or after drying and separating from the support is transferred to the wet process. By the term "wet process" used herein is meant a process in which a film is immersed in a liquid or sprayed with a liquid to extract an inorganic salt, a solvent or the like from the film. An aqueous medium is advantageously used in the wet process. For example, there may be used a mixture of water with an alcohol or a solvent contained in the dope, an aqueous solution containing an inorganic salt and a medium composed solely of water. In short, the film can be extracted or sprayed with a solution containing at least 30% of water.

If uniform extraction from the film and uniform coagulation of the film are not performed in the wet process, such disadvantages as degradation of the surface state of the film, deterioration of the physical properties and opacification of the film are caused. It is preferred that extraction be carried out at a temperature of from $-5°$ to 95° C. by using an aqueous medium in the wet process. A solvent or an aqueous extractant in a self-supporting film exhibits a plasticizing effect, and therefore, it can be stretched at a relatively low temperature of 0° to 200° C. It is possible to stretch the film in or outside a bath used in the wet process, or just after peeling from the support by using a roll or the like. The stretch ratio, stretch speed and stretch temperature may be adjusted so as to control the physical properties of the final product film, but it is ordinarily preferred that stretching be carried out at a stretch ratio of 0.8 to 3.0 at least in one direction. The stretch stress should be lower than the breakage stress of the film, and a stretch stress of $1 \times 10^{-2}$ to 18 kg/mm$^2$ is ordinarily preferred.

The film coming from the wet process is dried at a temperature of 200° to 500° C. so as to remove volatiles contained in the film and improve the film's physical properties. This drying is carried out in air or in an inert atmosphere (in nitrogen or in vacuum) by contact with a heating roll or by means of a tenter dryer. During or just after the drying operation, the film is stretched in the casting direction (hereinafter referred to as "MD" for brevity) or the transverse direction thereto (hereinafter referred to as "TD" for brevity) or in both directions to effect heat setting or relaxation. The stretch ratio, relax ratio and heat set conditions are important factors for determining the characteristics of the film.

In connection with the thermal dimensional characteristics of the film of the present invention, it is especially preferred that the product of the thermal shrinkage factor and the thermal expansion coefficient in at least one direction in the plane of the film is in the range of from $1.0 \times 10^{-7}$ to $1.0 \times 10^{-4}$ (mm/mm/°C.)$\times$(%). The thermal shrinkage factor referred to herein means the ratio in % defined by the formula: $[(A-B)/A] \times 100$ wherein A is the original length before shrinkage and B is the length after shrinkage at 250° C. under no load.

"Thermal expansion coefficient" means thermal expansion of the film within the temperature range of from 80° to 150° C., which is expressed in the unit of mm/mm/°C.

When the dimensional change characteristics are outside the above-mentioned range, the dimension stability of the film at high temperatures is reduced and, when the film is laminated with other materials, curls or wrinkles are formed to reduce the flatness and degrade the performances of the laminated materials. These defects are especially conspicuous in the case of magnetic recording media formed by vacuum deposition.

The thermal dimensional change depends upon the composition of the polymer and the film-forming conditions. The larger the proportion of the main recurring units represented by the above-mentioned general formula in the constituent units of the polymer, the smaller the dimensional change. The larger the proportion of the comonomer component, the larger the dimensional change. However, if the requirement of the copolymer composition of the present invention is satisfied, the dimensional change characteristics can be controlled within the range specified in the present invention. From the viewpoint of the dimensional change characteristics, it is especially preferred that the proportion of the basic recurring units be 60 to 90 mole %.

The thermal expansion coefficient and thermal shrinkage factor are not independently changed but are changed relative to each other. From the practical viewpoint, it is preferred that the relational formula of the two factors have values within a certain range. Examination of the film-forming conditions reveals that a high stretch ratio and low heat set temperature result in a high thermal shrinkage factor, but essentially a low thermal expansion coefficient. Due to the important contribution of the stretch and heat set conditions in dimensional change, the in-plane stretch ratio (MD$\times$TD) is 0.85 to 4.8 based on the length just after casting. It is preferred, however, that stretching be carried out under such tension that the stress at the stretch temperature be 0.1 to 18 kg/mm$^2$. Furthermore, the dimensional change of the film is influenced by the degrees of tension and relaxation of the polymer chain and by crystallinity, therefore, it is especially preferred that drying and heat setting after the wet process, which are related to the relaxation and crystallinity, be carried out at 200° to 500° C., especially 230° to 450° C.

In the present invention, it is especially preferred that the density of the film be in the range of from 1.400 to 1.490 g/cm$^3$ in the substantially additive-free state. The crystallinity or denseness of the film is represented by the density. A value of the density outside the above-mentioned range will tend to result in a brittle film or a film having too large a thermal dimensional change.

As will be apparent from the foregoing description, the relation between the thermal shrinkage factor and the thermal expansion coefficient can be controlled within the above-mentioned range by controlling various conditions. For example, this can be accomplished by the following method. A dope of a polymer having the composition specified in the present invention, comprising N-methylpyrrolidone solution, is cast on an endless metal belt through a die and is then dried in an atmosphere maintained at 180° C. at a speed of about 0.01 g/min.cm$^2$ to uniformly concentrate the dope. The formed film is peeled from the endless belt and guided into a water bath to effect desalination and removal of the solvent. Simultaneously, the film is stretched at a stretch ratio of about 1.3 in the casting direction (MD). The film in the water-absorbed state is placed in a clip type tenter, and the film is stretched at a stretch ratio of about 1.4 in the transverse direction (TD) to the casting direction at a temperature of 300° C. Simultaneously, the film is heat-set to effect orientation and crystallization. Of course, the film-forming method that can be adopted in the present invention is not limited to the above-mentioned method.

The importance of the thermal dimensional change in the present invention will now be described more specifically. When an Co layer having a thermal expansion coefficient of $2.2 \times 10^{-5}$ mm/mm/°C. is formed by vacuum deposition on a film having a thermal expansion coefficient of $1.0 \times 10^{-5}$ mm/mm/°C. at a film temperature of about 200° C. and the formed laminate is cooled to room temperature, curling with the Co layer being on the inner side is caused by the bi-metal effect. However, if this film has a high thermal shrinkage factor in the high temperature region, a laminate having good flatness at temperatures close to room temperature can be obtained by heating the laminate again at a temperature higher than the film temperature adopted at the vacuum deposition step to shrink the film. When this method is adopted, if one or both of the thermal shrinkage factor and thermal expansion coefficient are too large, it is impossible to satisfy the requirement for attaining good flatness.

As pointed out hereinbefore, it is preferred in the present invention that the composition, density and dimensional change characteristics be in the above-specified ranges. The film can further be improved by reducing the surface roughness of the film. Namely, it is preferred that the center average roughness (hereinafter referred to as "Ra" for brevity) be in the range of from $1 \times 10^{-4}$ to $0.01\mu$ and the maximum roughness (hereinafter referred to as "Rt" for brevity) be in the range of from $1 \times 10^{-3}$ to $0.1\mu$. In order to form such a smooth surface, it is necessary not only to pay attention to filtration of the starting materials, removal of dust and fine dispersion of additives, but also to avoid roughening of the surface by excessive heat treatment at the film-forming step. In connection with the conditions for drying and heat-setting the film, it is preferred that drying and heat setting be carried out at a temperature of 250° to 420° C. within 10 minutes, especially under such conditions that the product of the treating temperature (°C.) and the treating time (minutes) is within the range of from 300 to 3,500.

In order to improve the adhesion and bondability to other materials, the film of the present invention may be subjected to a physical or chemical surface treatment. As the chemical treatment, a corona discharge treatment, a low temperature plasma treatment and a flame treatment, which are conducted in various atmospheres, are valuable. As the gas to be used for these treatments, various gases such as oxygen, nitrogen, argon, hydrogen, neon, ammonia, steam, helium, carbon dioxide, nitrogen dioxide, carbon monoxide, nitrogen monoxide, ozone, sulfur dioxide and hydrogen sulfide are effective. Mixtures of two or more of these gases are often especially effective. The film of the present invention has isotropic characteristics, and when the mixing ratios of other materials are low, the film is excellent in transparency and has a dense structure. Accordingly, the film of the present invention is excellent in electrical properties and electrical insulativity and has a high chemical resistance. Namely, the film of the present invention is very stable against chemicals other than a strong acid such as sulfuric acid and an amide type solvent.

Since the film of the present invention has a specific polymer structure, a density within a certain range and such thermal expansion and shrinkage that the value of a certain relational formula of both the factors is within a certain range, when the film of the present invention is used in the form of a laminate with other material, deterioration of the shape characteristics, that is, formation of surface defects such as curls and wrinkles in the laminate, can be prevented.

In the case of magnetic recording medium, since the high performance magnetic layer is a metal having no substantial elongation, deformation of the base by an external force should be avoided. Furthermore, in this field, such a high-speed recording as cannot be attained according to the conventional technique is desired. Therefore, deformation of a tape proper by tension or the like during running is very severely regulated. Accordingly, it is preferred that the tensile modulus of the polymer film of the recording medium of the present invention in at least one direction be 400 to 10,000 kg/mm$^2$, especially 500 to 50,000 kg/mm$^2$. This characteristic is one as determined with respect to the state where the base is formed into a magnetic medium. Of course, the above characteristic of the base can be measured after the high performance magnetic layer has been removed by appropriate means. However, since the thickness of the magnetic layer is very small and the influences of the magnetic layer can substantially be neglected, the above characteristic may be regarded as that of the magnetic recording medium as a whole.

By the term "high performance magnetic layer" used herein is meant a so-called thin film type magnetic layer composed of a vacuum deposited metal or a metal compound. More specifically, the high performance magnetic layer comprises as the main component an element or alloy such as Co, Ni, Cr, Fe or $\gamma$-Fe$_2$O$_3$. A high performance magnetic layer composed mainly of Co or a cobalt alloy is especially preferred. It is preferred that the thickness of the high performance magnetic layer be 0.01 to 1$\mu$, more preferably 0.01 to 0.5$\mu$, most preferably 0.05 to 0.20$\mu$.

Since the film of the present invention is excellent over a widely used polyester film in the heat resistance and dimensional change characteristics and the temperature of the film can be elevated at the vacuum deposition step, a magnetic recordng medium excellent in the adhesive strength and magnetic characteristics can easily be obtained, and the thickness of the high performance magnetic layer can be reduced.

As the method for forming the high performance magnetic layer, there can be mentioned known methods such as the vacuum deposition method in which a metal or alloy is heated and evaporated in vacuum and is deposited on the base, the sputtering method in which atomes of a metal or metal compound as a target are expelled by argon activated and ionized by discharge in high vacuum and are deposited on the base, and the ion plating method. Namely, the ordinary vacuum deposition technique is conveniently adopted.

In formation of the high performance magnetic layer, cobalt is a most preferred element because the magnetic properties are good and the adhesive strength is high. If a small amount of nickel is incorporated, the corrosion resistance is improved. If chromium is incorporated into cobalt, a magnetic layer which is readily magnetized in the vertical direction is formed. It is preferred that vacuum deposition be carried out in such a manner that a vapor stream of a high performance magnetic material is produced by electron beam heating and brought into contact with the base film placed in contact with a cooling drum or the like whereby a thin magnetic layer having a thickness of 0.01 to 0.5μ, especially 0.05 to 0.20μ, is formed thereon. The degree of vacuum is ordinarily $10^{-7}$ to $10^{-2}$ mmHg. From the viewpoint of the magnetic properties, a gas such as oxygen, nitrogen or argon may positively be introduced into the vacuum deposition atmosphere from the outside. There can also be mentioned a method in which a high performance magnetic layer is formed on the polymeric base by plating in a wet bath. However, this method is not preferred because of such disadvantages as swelling and deterioration of the polymeric base in the wet bath. In other words, the present invention is limited to a magnetic recording medium in which the high performance magnetic layer is formed not in a liquid medium but in vacuum or in a certain gas; in other words by a dry process.

In the present invention, it is preferred that the glow discharge treatment be carried out in an atmosphere of argon or oxygen at a degree of vacuum of $10^{-2}$ to several mmHg before the vacuum deposition. If this preliminary treatment is performed, the adhesive strength is significantly improved over the adhesive strength attained when this preliminary treatment is not carried out.

Since a polymeric film comprising at least 50 mole % of the main recurring units hereinbefore mentioned is used as the base in the magnetic recording medium of the present invention, the magnetic recording medium of the present invention has a good thermal stability at high temperatures and can resist the heat generated at the vacuum deposition step. Accordingly, various limitations at the vacuum deposition step, such as employment of means for cooling the base below 80° C. and adoption of conditions moderating heat distortion of the base, that is, conditions sacrificing the magnetic properties and endurance characteristics, can be eliminated. Furthermore, the base can be heat-treated at or after the vacuum deposition, whereby the adhesive strength can drastically be improved. It is believed that by this heat treatment, the cohesive force of the thin metal film is increased to enhance the molecular compatibility with the interface of the base. It is preferred that the heat treatment be carried out at a temperature of 100° to 400° C., especially 120° to 250° C., under conditions not deteriorating the characteristics of the high performance magnetic layer. This heat treatment is effective not only for improving the adhesive strength but also for improving the magnetic recording properties by changing the chemical properties of the thin magnetic layer or the crystalline structure and crystalline morphology.

As is apparent from the foregoing illustration, the magnetic recording medium of the present invention has excellent properties over the conventional coating type magnetic recording medium or the conventional thin film type magnetic recording medium comprising as the base a polyester film or known heat-resistant film (for example, "Kapton" supplied by Du Pont Co.). More specifically, the magnetic recording medium of the present invention is a high-performance high-recording-density magnetic recording medium which is generally excellent in such characteristics as the adhesive strength, the dimensional stability at high temperatures, the dimensional stability against external forces and the dimensional stability in application.

The magnetic recording medium of the present invention is advantageously used for a video tape, an audio tape and various diskettes. Moreover, the present invention may be applied to all the kinds of magnetic recording materials such as electronically controlled cameras and video discs. Furthermore, the magnetic recording system employed may be either the horizontal magnetization system or the vertical magnetization system. In the case of the vertical magnetization system, a high temperature during metal deposition is advantageously adopted to obtain excellent coercive force and other properties. Thus, the heat resistant polyamide film of the present invention is suitable for this system.

If a cover layer is formed on the magnetic layer of the present invention or a backcoat layer for improving the running property or antistatic effect is formed on the back surface of the film base, it sometimes happens that the performance of the magnetic recording material as a whole is advantageously improved.

The properties of the magnetic recording material of the present invention and the film as the base are evaluated according to the following standards.

(1) Inherent Viscosity

The inherent viscosity is calculated according to the following formula:

$$\eta_{inh} = \frac{l_n(\eta_{rel})}{C}$$

wherein $\eta_{rel}$ represents the relative viscosity as measured at 30° C. and C is a value obtained when 0.5 g of the polymer is dissolved in 100 ml of concentrated sulfuric (2) Tensile Strength, Elongation and Tensile Modulus of the Base Film The strength, elongation and tensile modulus are measured according to the method of JIS (Japanese Industrial Standard) L-1073 at a temperature of 20° C. and a relative humidity of 75% by using "Tensilon" supplied by Toyo-Baldwin (3) Hygroscopic Expansion Coefficient A sample tape having a width of 5 mm and a length of 20 cm is allowed to stand in a chamber at a temperature of 20° C. and a relative humidity of 7% for 24 hours, and the relative humidity is then changed to 90% and the length of the tape is continuously measured. The humidity expansion coefficient is calculated from the value obtained after equilibrium has been reached.

(4) Adhesive Strength

Various methods have been examined as means for testing the adhesive strength between the film base and the thin metal film. It has been found that results are obtained with a good reproducibility at the actual machine test using a video device. A commercially available "Betamax" video deck supplied by Sony Co. is used as the actual machine. A tape having a length of 1 to 10 m is taken as a sample. The sample tape is run repeatedly and the damage of the film is examined. Similar observation is performed while allowing the sample to stand at a still position for a long time.

(5) Thermal Shrinkage Factor

A base film having a width of 10 mm and a length of 20 mm is allowed to stand in an oven maintained at 250° C. for 10 minutes, and the ratio (%) of the shrinkage to the original size is determined. As regards the humidity control condition before the measurement, the sample is allowed to stand in an atmosphere having a relative humidity of 0% (for example, in a $P_2O_5$ desiccator) for more than 48 hours to effect moisture desorption.

(6) Thermal Expansion Coefficient

In order to eliminate influences of the thermal shrinkage and the moisture absorption and desorption, a sample film is once heated at 150° C. and then gradually cooled. The thermal expansion coefficient is calculated from the dimensional change in the temperature region of from 80° to 150° C. The dimensional change can be measured by a thermomechanical analyzer (TMA) or the like.

(7) Density

The density of a film is measured at 25° C. by a lithium bromide-water type density gradient tube.

(8) Surface Roughness

The surface roughness of a film is measured by a stylus type surface roughness meter or by a microscopic measurement according to the interference method.

The present invention will now be described in detail with reference to the following examples.

EXAMPLES 1 THROUGH 5

In dehydrated N-methylpyrrolidone, 2-chloro-p-phenylene diamine in a molar ratio of 0.8 and 4,4'-diaminodiphenyl ether in a molar ratio of 0.2 were stirred and then terephthaloyl chloride in a molar ratio of 0.9 and isophthaloyl chloride in a molar ratio of 0.1 were added and maintained at 30° to 50° C. for 2 hours. Finely divided lithium carbonate was added in an amount of 96 mole % based on the evolved hydrogen chloride. The reaction mixture was stirred at 70° C. for 2 hours. Aqueous ammonia in an amount corresponding to 7 mole % was added to complete neutralization, and a film-forming dope having a polymer concentration of 10.0%, an inherent viscosity $\eta_{inh}$ of 2.1 and a solution viscosity of 4,500 poises (as measured at 30° C.) was finally obtained. The dope was filtered by a wool felt and then by a sintered metal filter capable of removing more than 90% of foreign matters having a size larger than 10μ. The dope was continuously cast on a stainless steel surface of a drum having a diameter of 2 m and a width of 40 cm at a speed of 1.2 m/min through a die, and the atmosphere was heated at 170° C. to evaporate a part of the solvent. After the cast dope was condensed to a polymer concentration of 40%, the resultant film was peeled from the drum. The film was continuously guided into a water bath filled with running water maintained at room temperature to remove the residual solvent and inorganic salts by extraction. The film was then led into a clip type tenter and dried and heat-set. At this step, the film was stretched at various stretch ratios in MD and TD by a nip roll and a tenter arranged in the water bath, and the drying and heat setting were carried out at various temperatures. Thus, a variety of film samples were prepared. The content of the main recurring units in the films was 72 mole %. The properties of the so-obtained films and the properties of laminates obtained by forming a layer of a Ni-Co alloy (25/75 weight ratio) having a thickness of 0.15μ on the films by vacuum deposition are shown in Table 1. Incidentally, at the vacuum deposition step, the films were heated by contacting them with a drum maintained at 200° C. The Ni-Co alloy vacuum-deposited films were very valuable as magnetic recording media.

TABLE 1

|  | Example 1 | Example 2 | Example 3 | Example 4 | Example 5 |
| --- | --- | --- | --- | --- | --- |
| Stretch Ratio in MD | 1.2 | 1.3 | 1.0 | 1.3 | 1.0 |
| Stretch Ratio in TD | 1.4 | 1.6 | 1.0 | 1.0 | 1.7 |
| Drying and Heat Setting Temperature and Time | 280° C. 2 minutes | 300° C. 2 minutes | 300° C. 2 minutes | 250° C. 2 minutes | 320° C. 2 minutes |
| Density (g/cm$^3$) of Film | 1.451 | 1.462 | 1.459 | 1.446 | 1.470 |
| Thermal Expansion Coefficient (mm/mm/RH) in MD | $0.7 \times 10^{-5}$ | $1.1 \times 10^{-5}$ | $1.4 \times 10^{-5}$ | $0.3 \times 10^{-5}$ | $1.7 \times 10^{-5}$ |
| Thermal Expansion Coefficient (mm/mm/RH) in TD | $0.65 \times 10^{-5}$ | $1.0 \times 10^{-5}$ | $1.2 \times 10^{-5}$ | $1.2 \times 10^{-5}$ | $0.3 \times 10^{-5}$ |
| Thermal Shrinkage Factor (%) in MD | 5.5 | 5.0 | 2.5 | 6.0 | 0.3 |
| Thermal Shrinkage Factor (%) in TD | 4.0 | 3.9 | 2.0 | 8.3 | 0.1 |
| (Thermal Expansion Coefficient) × (Thermal Shrinkage Factor) in MD | $3.85 \times 10^{-5}$ | $5.5 \times 10^{-5}$ | $3.5 \times 10^{-5}$ | $1.8 \times 10^{-5}$ | $0.51 \times 10^{-5}$ |
| (Thermal Expansion Coefficient) × (Thermal Shrinkage Factor) in TD | $2.6 \times 10^{-5}$ | $3.9 \times 10^{-5}$ | $2.4 \times 10^{-5}$ | $9.96 \times 10^{-5}$ | $0.3 \times 10^{-6}$ |
| Young's Modulus (kg/mm$^2$) in MD | 1050 | 1200 | 980 | 1250 | 1010 |
| Young's Modulus (kg/mm$^2$) in TD | 1100 | 1160 | 950 | 960 | 1430 |
| Hygroscopic Expansion Coefficient (mm/mm/RH) in MD | $1.2 \times 10^{-5}$ | $0.9 \times 10^{-5}$ | $1.1 \times 10^{-5}$ | $0.7 \times 10^{-5}$ | $1.2 \times 10^{-5}$ |
| Hygroscopic Expansion Coefficient (mm/mm/RH) in TD | $1.1 \times 10^{-5}$ | $0.83 \times 10^{-5}$ | $1.0 \times 10^{-5}$ | $1.3 \times 10^{-5}$ | $0.4 \times 10^{-5}$ |
| Ra (cut-off value = 0.08 mm) (μ) | 0.0021 | 0.0055 | 0.0057 | 0.0025 | 0.0060 |
| Rt (cut-off value = 0.08 mm) (μ) | 0.096 | 0.072 | 0.088 | 0.087 | 0.077 |
| Characteristics of Ni—Co Alloy-Film Laminate (40 mm × 40 mm) | Flatness restored by re-heating at 290° C. (curled just after lamination) | Same as in Example 1 | Flatness restored by reheating at 320° C. (curled just after lamination) | Flatness almost restored by re-heating at 270° C. (curled just after lamination) | Flatness almost restored by re-heating at 350° C. (curled just after lamination) |

TABLE 1-continued

|  | Example 1 | Example 2 | Example 3 | Example 4 | Example 5 |
|---|---|---|---|---|---|
| Thickness ($\mu$) of Final Film | 15 | 12 | 17 | 16 | 11 |

EXAMPLES 6 AND 7

In dehydrated dimethylacetamide, 2-chloro-p-phenylene diamine in a molar ratio of 0.6 and 4,4'-diaminodiphenyl sulfone in a molar ratio of 0.4 were reacted with terephthaloyl chloride in a molar ratio of 1.0 with stirring. Neutralization was carried out in the same manner as described in Example 1 to obtain a film-forming dope having a polymer concentration of 11.5%, an inherent viscosity $\eta_{inh}$ of 2.3 and a solution viscosity of 3,100 poises (as measured at 30° C.).

Film samples were prepared under various conditions by using the same casting, wet process, drying and heat setting equipment as used in Example 1. The content of the main recurring units in each film was 60 mole %.

Vacuum deposition of aluminum was effected on the films by sputtering to form a layer having a thickness of 0.2$\mu$, and a Ni-Co alloy (25/75 weight ratio) was vacuum-deposited on the aluminum layer in the same manner as described in Example 1 to form a layer having a thickness of 0.1$\mu$. In order to improve the adhesive strength between the film and the aluminum layer, the temperature of the can was maintained at 200° C. during the vacuum deposition. The properties of the films and laminates are shown in Table 2. From the data shown in Table 2, it is seen that films of the present invention are excellent, and valuable as magnetic recording media.

was charged with a large quantity of water, and the polymer solution was added thereto to effect precipitation and obtain a fibrous solid polymer. The polymer was washed and dried. Then 2 kg of the polymer was mixed with 1 kg of lithium bromide and 40 l of N-methylpyrrolidone to obtain a homogeneous solution at room temperature. The inherent viscosity of the polymer was 4.57. The solution was uniformly cast on a surface-polished stainless steel drum from a die and heated in an atmosphere maintained at 120° C. for about 20 minutes. The formed film was peeled from the drum and continuously immersed in a water bath for about 10 minutes. In a tenter, the film was heated at 300° C. for about 5 minutes while maintaining the constant length to obtain a transparent smooth film having a thickness of 16$\mu$.

The film had a strength of 40 kg/mm$^2$ and a tensile modulus of 1,500 kg/mm$^2$, and the thermal shrinkage factor at 250° C. was only 0.3%. Thus, it was confirmed that the obtained film was a high-tenacity heat-resistant film. Furthermore, the thermal expansion coefficient and humidity expansion coefficient at approximately room temperature were $4 \times 10^{-6}$ mm/mm/°C. and $5 \times 10^{-6}$ mm/mm/RH %, respectively. Thus, it was confirmed that the film was excellent also in environmental stability.

The film was placed in a vacuum tank and subjected

TABLE 2

|  | Example 6 | Example 7 |
|---|---|---|
| Stretch Ratio in MD | 1.2 | 1.5 |
| Stretch Ratio in TD | 1.4 | 1.7 |
| Drying and Heat Setting Temperature and Time | 300° C., 3 minutes | 280° C., 3 minutes |
| Density (g/cm$^3$) of Film | 1.444 | 1.447 |
| Thermal Expansion Coefficient (mm/mm/°C.) in MD | $2.5 \times 10^{-5}$ | $2.1 \times 10^{-5}$ |
| Thermal Expansion Coefficient (mm/mm/°C.) in TD | $2.3 \times 10^{-5}$ | $2.0 \times 10^{-5}$ |
| Thermal Shrinkage Factor (%) in MD | 3.6 | 4.1 |
| Thermal Shrinkage Factor (%) in TD | 3.5 | 4.0 |
| (Thermal Expansion Coefficient) × Thermal Shrinkage Factor) in MD | $9 \times 10^{-5}$ | $8.61 \times 10^{-5}$ |
| (Thermal Expansion Coefficient) × (Thermal Shrinkage Factor) in TD | $8.05 \times 10^{-5}$ | $8.0 \times 10^{-5}$ |
| Young's Modulus (kg/mm$^2$) in MD | 870 | 980 |
| Young's Modulus (kg//m$^2$) in TD | 880 | 930 |
| Hygroscopic Expansion Coefficient (mm/mm/RH) in MD | $1.8 \times 10^{-5}$ | $1.0 \times 10^{-5}$ |
| Hygroscopic Expansion Coefficient (mm/mm/RH) in TD | $1.7 \times 10^{-5}$ | $0.9 \times 10^{-5}$ |
| Ra (cut-off value = 0.08 mm) ($\mu$) | 0.0033 | 0.0011 |
| Rt (cut-off value = 0.08 mm) ($\mu$) | 0.090 | 0.043 |
| Characteristics of Al—Co—Ni/Film Laminate (40 mm × 40 mm) | Substantially flat, complete flatness attained by reheating at 300° C. | Same as in Example 6 |
| Thickness ($\mu$) of Final Film | 21 | 17 |

EXAMPLE 8

A stirring tank having a capacity of 200 l was charged with 100 l of dried N-methylpyrrolidone, and 8 kg of lithium chloride, 2.42 kg of 2-chloro-p-phenylene diamine and 0.60 kg of 4,4'-diaminodiphenyl ether were dissolved therein. The solution was gently stirred while maintaining the temperature at 0° C. While the solution was stirred, 4.07 kg of granulated terephthaloyl chloride was added to the solution over a period of about 30 minutes. Stirring was further continued for 1 hour to obtain a viscous polymer solution. A large-scale mixer to ion bombardment treatment in an argon gas atmosphere of $10^{-2}$ Torr. Then, the vacuum tank was evacuated to $10^{-6}$ Torr. While the film was run, a Co-Ni alloy (comprising 75% by weight of Co and 25% by weight of Ni) was vacuum-deposited in a thickness of 0.15$\mu$ by an inclined electron beam vacuum deposition method at an incident angle larger than 70° to form a magnetic tape having a high performance thin metal magnetic layer. The coercive force in MD was 720 Oe, the coercive force in TD was 480 Oe, and the squareness ratio was 0.92. Accordingly, it was confirmed that the obtained tape was a magnetic tape oriented in MD, which had properties suitable for an audio tape and a video tape.

This magnetic tape was set in a commercially available Betamax home video deck supplied by Sony Co. and subjected to the running and still tests 100 times. It was confirmed that the adhesive strength of the magnetic layer was very excellent, i.e., neither falling of the magnetic layer nor deformation of the tape was substantially caused and no prominent increase of drop-out took place.

COMPARATIVE EXAMPLE 1

A magnetic tape was prepared by using a polyethylene terephthalate film ("Lumirror" supplied by Toray) or a polyimide film ("Kapton" supplied by Du Pont) in the same manner as described in Example 8.

In case of the polyethylene terephthalate film, perforation by heat was often caused at the ion bombardment treatment or vacuum deposition, and a long tape could not be prepared. When the tape was repeatedly subjected to the running or still test in a Betamax home video deck many times, partial breakage or falling of the magnetic layer was caused. It was confirmed that the the adhesive strength of the polyethylene terephthalate to the metal layer was insufficient.

In case of Kapton, heat distortion was not caused during the manufacture, but, probably because of a poor surface smoothness, a tape having stable magnetic recording characteristics could not be obtained. Furthermore, since the tape was poor in stiffness and dimensional stability (the humidity expansion coefficient was $32 \times 10^{-6}$ mm/mm/RH %), no good tape characteristics could be obtained.

EXAMPLE 9

A magnetic thin layer composed of a Co-Cr alloy was formed on the film having a thickness of 16μ, which was obtained in Example 8, by using a magnetron type RF sputtering equipment.

The film was placed in a vacuum tank. The vacuum tank was evacuated to $10^{-6}$ Torr and Ar gas was introduced to maintain a pressure of $10^{-2}$ Torr. Then, a high frequency voltage of 13.56 MHz was applied to a Co-Cr alloy target (81% by weight of Co and 19% by weight of Cr) having a diameter of 150 mm and sputtering was carried out at a supplied power of 200 W for 30 minutes to form a magnetic thin film having a thickness of 0.5μ. The coercive forces in the directions vertical and parallel to the surface of the Co-Cr layer were 1,100 Oe and 600 Oe, respectively. In this magnetic layer, the residual magnetism in the direction vertical to the layer surface was larger than the residual magnetism in the direction parallel to the layer surface. It was confirmed that the magnetic layer had an easily magnetizable axis in the vertical direction and the magnetic tape had properties suitable for a vertical recording medium.

When the tape was subjected to the durability test in a commercially available video deck, it was found that the adhesive strength between the base film and the magnetic layer was high.

EXAMPLE 10

An iron oxide thin layer was formed on the film having a thickness of 16μ, which was obtained in Example 8, by using a sintered body of $Fe_3O_4$ as a target and a magnetron type RF sputtering equipment.

The film was placed in a vacuum apparatus. The vacuum apparatus was evacuated to $10^{-6}$ Torr, and Ar gas containing 6% by volume of oxygen gas was introduced into the vacuum apparatus to maintain the pressure at $5 \times 10^{-3}$ Torr Then, a high frequency voltage of 13.56 MHz was applied to the target and sputtering was carried out at a supplied power of 200W to form an $Fe_3O_4$ layer having a thickness of 0.2μ. Then, the film was subjected to oxidation by heat in the air at 260° C. for 60 minutes to convert the $Fe_3O_4$ layer to a $\gamma\text{-}Fe_2O_3$ layer. The obtained $\gamma\text{-}Fe_2O_3$ layer had a coercive force of 350 Oe, a residual magnetic flux density of 1,500 G and a square ratio of 0.81.

This tape was not deformed to any significant extent by a high temperature treatment. It was confirmed that the durability of the magnetic layer was satisfactory as in case of the tapes obtained in Examples 8 and 9.

EXAMPLE 11

In the same manner as described in Example 8, 10 kg of lithium chloride, 2.00 kg of 2-chloro-p-phenylene diamine and 1.19 kg of 4,4'-diaminodiphenyl methane were dissolved in 100 l of dried N,N'-dimethylacetamide, and the solution was maintained at 0° C. Then, 4.08 kg of terephthaloyl chloride was added to the solution and in the same manner as described in Example 8, a solid polymer was obtained. The polymer had an inherent viscosity of 2.89. Then, 2 kg of the polymer was mixed with 1 kg of calcium chloride and 25 l of N-methylpyrrolidone and a transparent smooth film having a thickness of 16μ was obtained in the same manner as described in Example 8.

The film had a strength of 32 kg/mm² and a tensile modulus of 950 kg/mm² and the thermal shrinkage factor at 250° C. was 1.2%. Thus, it was confirmed that the film was a high-tenacity heat-resistant film. The thermal expansion coefficient and hygroscopic expansion coefficient of the film were $6 \times 10^{-6}$ mm/mm/°C. and $11 \times 10^{-6}$ mm/mm/RH %, respectively.

A magnetic tape was prepared from this film in the same manner as described in Examples 8 through 10. It was found that the magnetic tape was satisfactory, though the tape was slightly inferior to the magnetic tape obtained in Example 8.

COMPARATIVE EXAMPLE 2

In the same manner as described in Example 8, 1.14 kg of 2-chloro-p-phenylene diamine and 2.38 kg of 4,4'-diaminodiphenyl methane were dissolved in 100 l of dried N,N'-dimethylacetamide, and the solution was maintained at 0° C. Then, 2.07 kg of terephthaloyl chloride was added to the solution and a solid polymer having an inherent viscosity of 2.52 was obtained in the same manner as described in Example 8. Then, 2 kg of the polymer was mixed with 25 l of N-methylpyrrolidone and 0.5 kg of calcium chloride, and a smooth film having a thickness of 15μ was obtained in the same manner as described in Example 8.

This film had such a high moisture absorption of 6.8% and a humidity expansion coefficient of $2.0 \times 10^{-4}$ mm/mm/RH %. It was confirmed that the film was not suitable as a base film of a magnetic tape. Furthermore, the heat resistance of the film was poor, the thermal shrinkage factor was about 5.3% at 200° C., and the thermal expansion coefficient was $0.8 \times 10^{-4}$ mm/mm/°C. Moreover, troubles due to heat distortion were frequently caused during vacuum deposition. When the obtained magnetic tape was repeatedly subjected to the running test many times, partial breakage or falling of the magnetic layer was often caused as in case of the polyethylene terephthalate base film.

We claim:

1. An improvement in a magnetic recording medium which comprises the combination of a magnetic layer and a film of an aromatic polyamide having at least 50 mol % of recurring units represented by the following general formula:

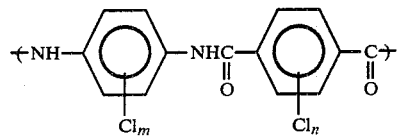

wherein m and n are integers of form 0 to 4, with the proviso that the case where both m and n are 0 is excluded, and at least one high performance magnetic layer being composed of a metal or a metal compound vacuum-deposited on the aromatic polyamide film, said aromatic polyamide film having a density of from 1.400 to 1.490 g/cm$^3$ in the state where the film is composed substantially solely of the aromatic polyamide, and the product of the thermal shrinkage factor and the thermal expansion coefficient in at least one direction in the plane of the film being in the range of from $1.0 \times 10.^{-7}$ to $1.0 \times 10^{-4}$, said combination of magnetic layer and film having substantial flatness and essentially no tendency to curl or wrinkle.

2. A magnetic recording medium as set forth in claim 1, wherein the aromatic polyamide has at least 50 mole % of recurring units represented by the following formula:

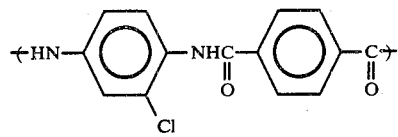

3. A magnetic recording medium as set forth in claim 1, wherein the aromatic polyamide has at least 50 mole % of recurring units represented by the following formula:

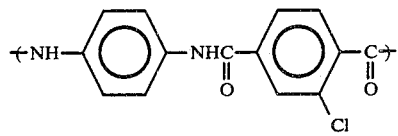

4. A magnetic recording medium as set forth in claim 1, wherein the central average roughness (Ra) of the surface of the aromatic polyamide film is $1 \times 10^{-4}$ to $0.01\mu$ maximum roughness (Rt) is $1 \times 10^{-3}$ to $0.1\mu$.

5. A magnetic recording medium as set forth in claim 1, wherein the tensile modulus of the aromatic polyamide film in at least one direction is 400 to 10,000 kg/mm$^2$.

6. A magnetic recording medium as set forth in claim 1, wherein the high performance magnetic layer is mainly comprised of a component selected from the group consisting of Ni, Co, Cr and Fe and alloys thereof and $\gamma$-Fe$_2$O$_3$.

7. A magnetic recording medium as set forth in claim 1, wherein the thickness of the high performance magnetic layer is 0.01 to 1$\mu$.

8. A magnetic recording medium as set forth in claim 1, wherein said magnetic recording medium is of the type suitable for the vertical magnetization system.

* * * * *